J. BURNS.
Tea Kettle.
No. 85,429.　　　　　　　　　　Patented Dec. 29, 1868.
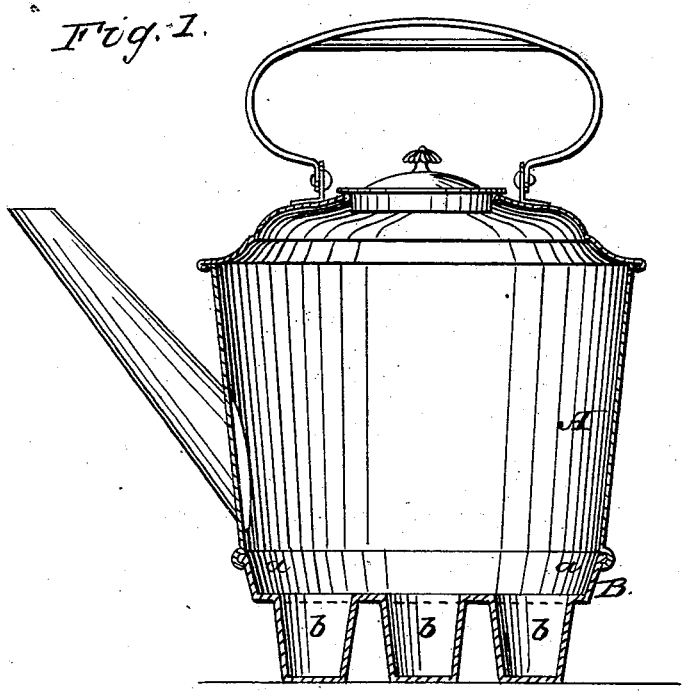
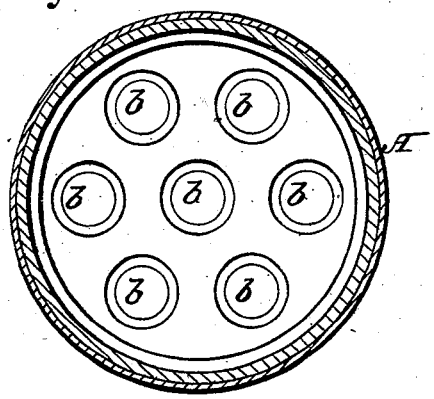

JABEZ BURNS, OF NEW YORK, N. Y.

Letters Patent No. 85,429, dated December 29, 1868.

IMPROVEMENT IN KETTLES FOR CULINARY PURPOSES.

The Schedule referred to in these Letters Patent and making part of the same.

*To all whom it may concern:*

Be it known that I, JABEZ BURNS, of the city, county, and State of New York, have invented a new and useful Improvement in Kettles for Culinary Purposes; and I do hereby declare the following to be a full, clear, and exact description thereof, which will enable those skilled in the art to make and use the same, reference being had to the accompanying drawing, forming part of this specification, in which drawing—

Figure 1 represents a vertical central section of this invention.

Figure 2 is a horizontal section thereof.

Similar letters indicate corresponding parts.

This invention relates to a kettle for culinary purposes, such as a tea-kettle, coffee-kettle, wash-kettle, or a kettle of any other similar description, the body of which is made of sheet-metal and soldered to a bottom of cast-iron, said bottom being provided with a bead at its edge, over which the edge of the sheet-metal body is bent in such a manner that a bottom is obtained which is cheaper and more durable than an ordinary bottom of sheet-metal, and which can be readily and firmly secured to the body of the kettle.

The bottom is provided with a number of depressions or water-legs, which are cast solid with said bottom, and which, being exposed to the direct action of the fire, considerably facilitate the effect of the heat on the contents of the kettle, while they do not materially increase the cost of the bottom.

A represents the body of my kettle, which is made of sheet-metal in the usual form or shape, according to the purpose for which it is to be used.

This body is connected to the bottom, B, which I make of cast-iron, and which is provided with a bead, a, on its edge, over which the edge of the body A is bent, as clearly shown in the drawing, and finally, the joint is rendered tight by soldering.

The advantages of a cast-iron bottom, over an ordinary bottom of sheet-metal, will be readily appreciated, my cast-iron bottom being cheaper and more durable than an ordinary bottom; and, by means of the bead a, I am enabled to connect the bottom to the body of the kettle in such an easy and firm manner that no amount of knocking about will render the joint loose.

The heating-surface of the bottom, B, is increased by a series of water-legs, b, which are cast solid therewith, and which, when the kettle is placed over a fire, are exposed to the direct action of the heat.

By casting these water-legs solid with the bottom, I am enabled to obtain a very great heating-surface, with but a trifling increase in the cost of the bottom.

I do not claim broadly, as my invention, a kettle composed of a sheet-metal body and a cast-iron bottom, such being shown and described in the patent of L. J. Worden, June 2, 1863; but having thus described my invention,

What I claim as new, and desire to secure by Letters Patent, is—

1. As a new article of manufacture, the bottom, B, cast with water-legs, b, and a bead, a, around which the lower edge of the body A is bent and secured simply by soldering, substantially as described and shown.

2. The kettle, constructed, as described, of the bottom, B, cast with the water-legs b and bead a, and the body A, of sheet-metal, secured to the bottom by having its lower edge bent over the bead and soldered, as herein described.

JABEZ BURNS.

Witnesses:
W. HAUFF,
E. F. KASTENHUBER.